(12) United States Patent  (10) Patent No.: US 8,327,393 B2
Ogawa  (45) Date of Patent: Dec. 4, 2012

(54) DISC-CLAMPING MECHANISM AND DISC DRIVING APPARATUS

(75) Inventor: Motoharu Ogawa, Gunma-ken (JP)

(73) Assignee: JVC Kenwood Corporation, Yokohama-shi (JP)

( * ) Notice: Subject to any disclaimer, the term of this patent is extended or adjusted under 35 U.S.C. 154(b) by 89 days.

(21) Appl. No.: 13/070,821

(22) Filed: Mar. 24, 2011

(65) Prior Publication Data

US 2011/0321069 A1  Dec. 29, 2011

(30) Foreign Application Priority Data

Jun. 24, 2010  (JP) .................................. 2010-143417

(51) Int. Cl.
*G11B 17/028* (2006.01)
(52) U.S. Cl. ........................................................ 720/706
(58) Field of Classification Search .................... 720/706
See application file for complete search history.

(56) References Cited

U.S. PATENT DOCUMENTS

| | | | | |
|---|---|---|---|---|
| 5,058,094 A * | 10/1991 | Suzuki | ............................ | 720/706 |
| 5,970,044 A * | 10/1999 | Kambayashi et al. | ........ | 720/713 |
| 6,160,780 A * | 12/2000 | Furukawa et al. | ............ | 720/604 |
| 6,388,983 B1 * | 5/2002 | Kikuchi | ........................ | 720/710 |
| 6,754,903 B2 * | 6/2004 | Kato | .............................. | 720/713 |
| 7,114,165 B2 * | 9/2006 | Kuo et al. | ..................... | 720/706 |
| 7,343,609 B2 * | 3/2008 | Lin | ................................ | 720/706 |
| 7,437,747 B2 * | 10/2008 | Yang | ............................. | 720/706 |
| 7,555,762 B2 * | 6/2009 | Hasegawa et al. | ............ | 720/712 |
| 7,802,270 B2 * | 9/2010 | Ogawa et al. | ................. | 720/706 |
| 7,802,271 B2 * | 9/2010 | Sonoda | ........................ | 720/706 |
| 7,831,985 B2 * | 11/2010 | Fukasawa | .................... | 720/706 |
| 2006/0174255 A1 * | 8/2006 | Chuo | ........................... | 720/706 |

FOREIGN PATENT DOCUMENTS

JP  H06-4945 U  1/1994
JP  H07-272371 A  10/1995

* cited by examiner

*Primary Examiner* — Angel A. Castro
(74) *Attorney, Agent, or Firm* — Marvin A. Motsenbocker; Mots Law, PLLC

(57) ABSTRACT

A simplified disc-clamping mechanism is provided to decrease the number of parts and processes of the assembly of a disc-clamping mechanism. The disc-clamping mechanism has a clamping plate sandwiching a disc by cooperating with a turntable, and a clamp base rotatably holding the clamping plate. The clamping plate has a surface plate pressing a disc toward the turntable, a small-radius body portion having an outer diameter smaller than that of the surface plate portion, and a flange portion protruding more than an end portion in an axial direction of the small-radius body portion and being parallel to the surface plate portion. The clamp base is integrally formed while including a thin-plate shaped holding portion, a stopper piece, and a bent portion which extends from the holding portion.

7 Claims, 12 Drawing Sheets

DISC-CLAMPING MECHANISM AND DISC DRIVING APPARATUS

CROSS REFERENCE TO RELATED APPLICATIONS

This application claims priority based on 35 USC 119 from prior Japanese Patent Application No. P2010-143417 filed on Jun. 24, 2010, entitled "DISC-CLAMPING MECHANISM AND DISC DRIVING APPARATUS", the entire contents of which are incorporated herein by reference.

BACKGROUND OF THE INVENTION

1. Field of the Invention

The present invention relates to a disc driving apparatus, which is used for reproducing audio data recorded on a disc (a disc-shaped recording medium) and to recording desired data on a disc. In particular, the present invention relates to a mechanism to clamp a disc while reproducing and recording and to a disc driving apparatus that includes the same mechanism.

2. Description of the Related Art

Generally, a disc driving apparatus, such as a CD player or a DVD player, includes a turntable that holds and rotates a disc, an optical pickup that moves in a radial direction along the surface of a disc, a disc-clamping mechanism that clamps the disc so as to make the disc synchronously rotated with the turntable, and so on.

One of the known disc-clamping mechanism is as follows. The disc-clamping mechanism includes a clamping plate (clamper) rotatably sandwiching a disc by cooperating with a turntable, and a clamp base (clamp arm) whose one end is used as a fulcrum so as to pivot in an up and down direction, wherein a clamper holder made from a metal plate and so on is screwed and fixed on the clamp base so as to rotatably hold the clamping plate by the clamp holder and the clamp base (for example, refer to Patent document 1: Japanese Utility Model Patent Application Publication No. hei6-4945, paragraphs 0003 to 0007, FIG. 3 and FIG. 4).

In addition, a structure having a square hole on a clamp base, whose outer-edge works as elastic element to set a clamping plate on the clamp base, a clamping plate which has two disc-shaped flanges, and the clamp base which rotatably holds the clamping plate is known as a disc-clamping structure (for example, refer to Patent document 2: Japanese Patent Application Publication No. hei7-272371, paragraph 0030 and FIG. 13).

Nevertheless, the structure described in Patent document 1, which has a clamping plate rotatably held by a clamp base and a separately formed clamper holder screwed on it, has the following problems. One is high cost and increase in the number of parts because a clamper holder and screws are needed to screw a clamper holder on a clamp base. Another problem is an increase of the number of processes when assembling a clamping plate, which inhibits productivity.

In addition, according to Patent document 1, rattle is prevented when a disc-clamping by a clamping plate is released since the clamping plate contacts a part of a chassis. However, a concerns that rattle noise occurs due to shaking of the clamping plate in the diameter direction under the environment of vibrations, such as in-car use, because a motion of the clamping plate is limited only in the axial direction according to Patent document 1.

According to the supporting structure of Patent document 2, the number of parts can be reduced. However, it is a difficult to make a support member from a metal material that is rigid because the outer-edge of the square hole is required for the part to have elasticity. Another problem is that rattle noise easily occurs because a clamping plate set in a square hole can move in the diameter direction (i.e. plane of the plate) and axial direction (i.e. vertical of the plate) of a clamping plate when in an unclamped state.

SUMMARY OF THE INVENTION

The present invention alleviates the problems explained above. An object of embodiments is to reduce the number of processes to assemble the clamping plate with the simplified disc-clamping structure. An additional object is to reduce rattle noise caused by a vibration of a clamping plate when in an unclamped state.

In order to reduce the number of processes to assemble a clamping plate, a disc-clamping mechanism 4 of this invention comprises (1) clamping plate 41 sandwiching disc D by cooperating with rotatable turntable 32, and clamp base 42 which rotatably holds clamping plate 41, thus permitting movement between a clamp-position where the clamping plate contacts with disc D on turntable 32 and a clamp-released position where clamping plate 41 is isolated from disc D, wherein clamping plate 41 comprises surface plate portion 41a pressing disc D toward turntable 32 when clamp base 42 is in the clamp-position, small-radius body portion 41c placed concentrically with surface plate portion 41a and having an outer diameter smaller than that of surface plate portion 41a, and flange portion 41b being parallel to surface plate portion 41a and protruding more than an end portion in an axial direction of small-radius body portion 41c, wherein clamp base 42 is integrally formed while interposing a thin-plate shaped holding portion 42c between surface plate portion 41a and flange portion 41b on clamping plate 41, stopper piece 42d facing an end surface of flange portion 41b in the clamp-position, and bent portion 42e extending from holding portion 42c and having elongated hole h2 through which flange portion 41b is passed from stopper piece 42d side to holding portion 42c side in a diameter direction of flange portion 41b, wherein holding portion 42c has cut hole h1 which receives small-radius body portion 41c, cut hole h1 being adjacent to elongated hole h2 of bent portion 42e.

(2) In the above in the thickness of holding portion 42c may be smaller than any other part of clamp base 42.

(3) Moreover, to prevent rattle noise, disc-clamping mechanism 4 comprises a lock means to restrict a movement of clamping plate 41 when clamp base 42 is in the clamp-released position, wherein the lock means comprises first lock means 12a which limit a movement in axial direction of clamping plate 41 by pressing clamping plate 41 toward turntable 32, and second lock means 12b and stopper piece 42d which limit a movement in a diameter direction of clamping plate 41 by closely contacting the outer-edge of clamping plate 41.

(4) Also, provided is a disc driving apparatus that comprises disc-clamping mechanism 4 explained above.

Embodiments contribute to reduction of manufacturing cost because of an advantageous structure, where the part rotatably holding a clamping plate is not screwed on a clamp base but a clamping plate is installed directly on a clamp base. This reduces the number of parts. In addition, this improves productivity by decreasing the number of processes to assemble the clamping plate.

According to embodiments, the thickness of a holding portion, which is in shape of thin plate and integrally formed with a clamp base so as to rotatably hold a clamping plate, is smaller than any other part of the clamp base. Thus, the clamping plate has a small gap between a surface plate portion and a flange portion. This can prevent contacts from a holding portion interposed between a surface plate portion and a flange portion, with both the surface plate portion or the flange portion when the clamping plate is rotating with the disc. Therefore, deterioration of the rotational performance of the disc and deformation of the shape of the clamping plate by frictional heat are prevented.

Furthermore, this arrangement alleviates rattle noise caused by vibration of the clamping plate because the clamping plate is held stable even under a vibrational environment, such as in-car use. Here, the reason why the clamping plate is held stable under a vibrational environment is that the disc-clamping structure is equipped with a first lock means limiting the clamping plate to move in the axial direction of the clamping plate by pressing the clamping plate to the turntable side, and a second lock means limiting the clamping plate to move in the diameter direction of the clamping plate by closely contacting with the periphery of the clamping plate.

DETAILED DESCRIPTION OF EMBODIMENTS

This embodiment is described in detail referring to the figures. Firstly, an internal structure of a disc driving apparatus, which includes the disc-clamping mechanism in this embodiment, is shown as described in the comprehensive structure of FIG. 1.

Figure 1:
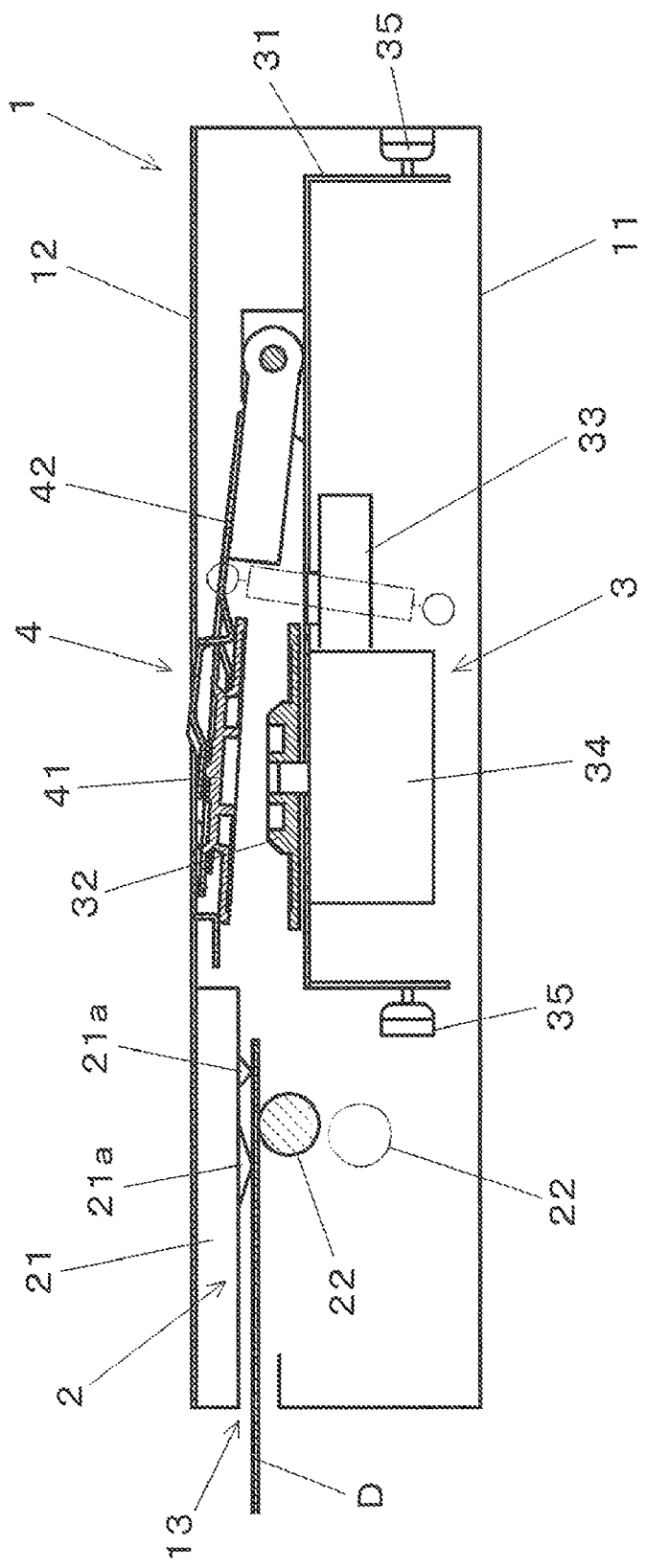
FIG. 1 is a side view of the internal structure of the disc driving apparatus including the disc-clamping mechanism in an embodiment.

In FIG. 1, reference numeral 1 denotes a case body forming an exterior of the apparatus. Case body 1 includes base chassis 11 formed by pressing a metal plate, and top plate 12 covering the top thereof. Also, slot 13, which is long in the horizontal direction, is opened at the front of case body 1 in order to insert and eject disc D.

Reference numeral 2 denotes a disc transferring mechanism disposed at slot 13 side of case body 1. Disc transferring mechanism 2 includes disc sliding and contacting plate 21, which is made of synthetic resin and fixed on the inner surface of top plate 12, and transfer roller 22, which is placed below disc sliding and contacting plate 21 and which can rotate forward and reverse. Transfer roller 22 can be lifted up and down between a position shown by dotted line of FIG. 1, which is a standby position, and a position shown by the solid line of FIG. 1.

According to the above-referenced disc transferring mechanism 2, in transferring disc D, transfer roller 22 moves upward from the standby position while rotating, disc D is interposed between transfer roller 22 and disc sliding and contacting plate 21, and disc D is transferred in that state.

Disc sliding and contacting plate 21 has two protrusions 21a formed perpendicular to the disc transfer direction. The heights of protrusions 21a become gradually smaller from the outer-edge to the center of disc sliding and contacting plate 21 so as to slide to and contact only around the edge of disc D. In addition, the diameter of roller 22 also becomes gradually smaller from the outer-edge to the center. Thus, protrusions 21a and roller 22 can contact with only the edge of disc D and then can alleviate a friction loss of the recorded area of disc D.

In FIG. 1, reference numeral 3 denotes a drive unit also known as a "tora-meka" which is composed by integrally assembling turntable 32, optical pickup 33 and other parts on metal base plate 31. Turntable 32 is a circular rotating member that holds and rotates disc D and which is rotatably driven while connected directly with a rotor axis of spindle motor 34 fixed on base plate 31. Optical pickup 33 is an electronic part unit to read or write the data on the disc while moving in the radial direction of the disc held on turntable 32. Also, optical pickup 33 is equipped with a light-emitting device such as a laser diode which emits the light to irradiate the surface of the disc, a light-receiving device which receives the light reflected from the disc, and so on.

Base plate 31, which is a component of drive unit 3, is elastically held on base chassis 11 via vibration-proof dampers 35. Consequently, jumpiness of reproduced sound and so on while driving a disc is alleviated.

Also, in FIG. 1, reference numeral 41 denotes a clamping plate interposing a disc, by cooperating with turntable 32, so as to be rotatable. Reference numeral 42 denotes a clamp base holding the clamping plate 41 so as to be rotatable. These parts compose disc-clamping mechanism 4 in an embodiment.

Figure 2:
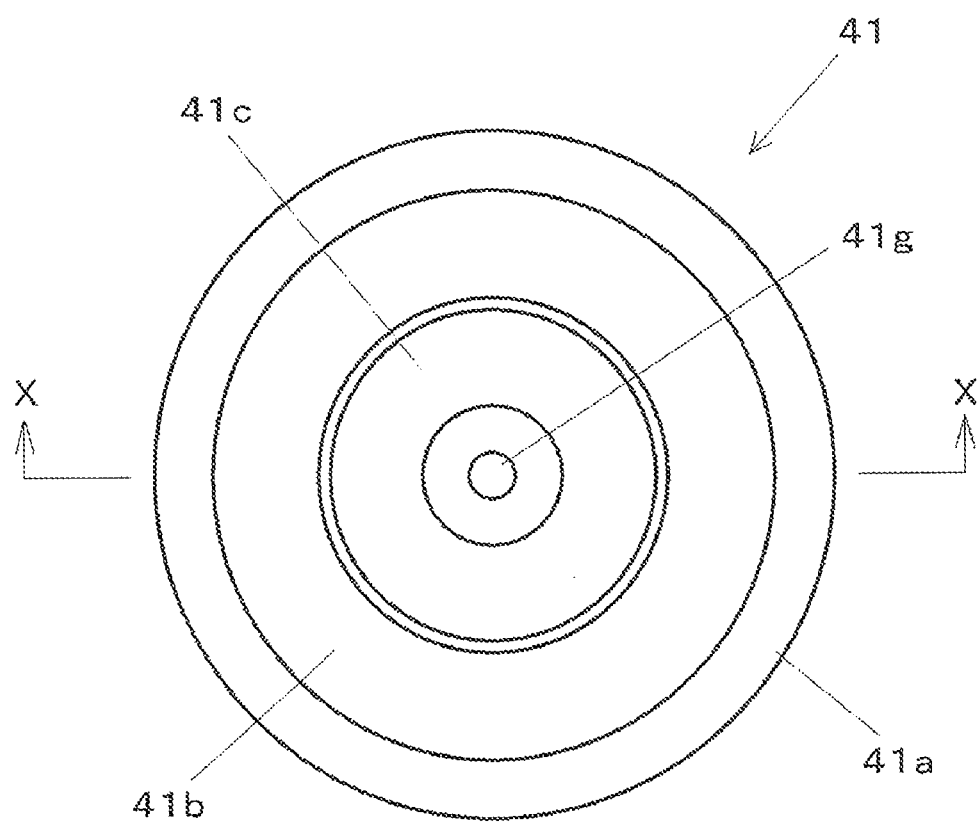
FIG. 2 is a plan view of the clamping plate in an embodiment.
Figure 3:
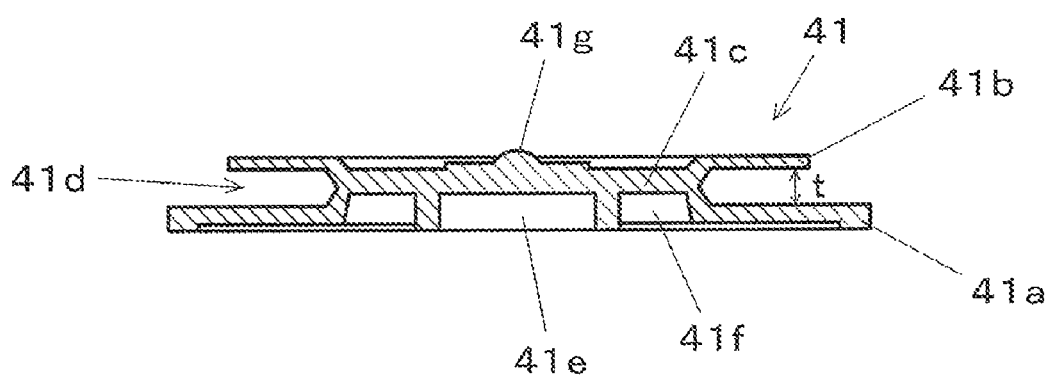
FIG. 3 is a cross-sectional View taken along the line X-X in FIG. 2.

Hereinafter, disc-clamping mechanism 4 will be explained. In FIG. 2 and FIG. 3, clamping plate 41 includes surface plate portion 41a and flange portion 41b, both concentrically placed while sandwiching small-radius body portion 41c. In particular, clamping plate 41 of this embodiment is integrally formed from synthetic resin and the outer diameter of surface plate portion 41a is approximately same as the outer diameter of turntable 32 shown in FIG. 1 (for example 30 mm). Flange portion 41b protrudes from the outer-edge of small-radius body portion 41c (one outer-edge of the small-radius body portion 41c in the axis direction) to be parallel to surface plate portion 41a. The outer diameter of flange, portion 41b is set smaller than that of surface plate portion 41a and larger than that of small-radius body portion 41c. Thus, annular groove 41d exists between surface plate portion 41a and flange portion 41b around the outer-edge of small-radius body portion 41c. The width of annular groove 41d is about 2 mm.

Moreover, as obviously shown in FIG. 3, small-radius body portion 41c includes center concave portion 41e formed on the center portion of the side of surface plate portion 41a, annular concave portion 41f surrounding center concave portion 41e, and hemisphere-shaped protrusion 41g formed as the center of the rotation at the center of the side of flange portion 41b.

Figure 4:
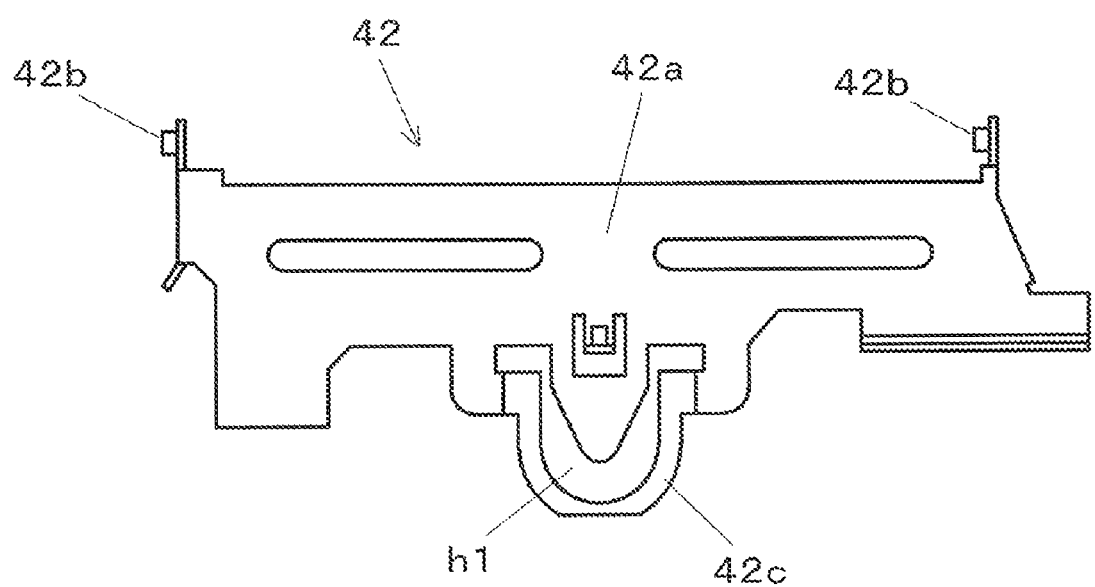
FIG. 4 is a plan view of the clamp base in an embodiment.

Then, in FIG. 4, clamp base 42 is formed by plastically deforming a metal plate by a press machine. The thickness of the plate is set from 0.8 mm to 1.0 mm. Fulcrum shaft 42b protrudes at both ends of length-direction edge of body portion 42a, which is horizontally long. Clamp base 42 can pivot on fulcrum shaft 42b between a clamp-position and a clamp-released position, which will be described later. Moreover, clamp base 42 is formed together with thin-plate shaped holding portion 42c extending from body portion 42a, which is horizontally long, to hold clamping plate 41.

Holding portion 42c, which is in U-shape whose inner side is cut off as cut hole h1, is thinner than any other parts of clamp base 42 with a thickness of 0.2 to 0.5 mm. Holding portion 42c is formed by punching a metal plate, which is a material of clamp base 42, in a predetermined shape, hitting a part, which is to be holding portion 42c, so as to make the part have a predetermined thickness before bending the metal plate, and cutting the edge, which is extended by the hitting, by a cutting process (extended-edge removal process).

Figure 5:
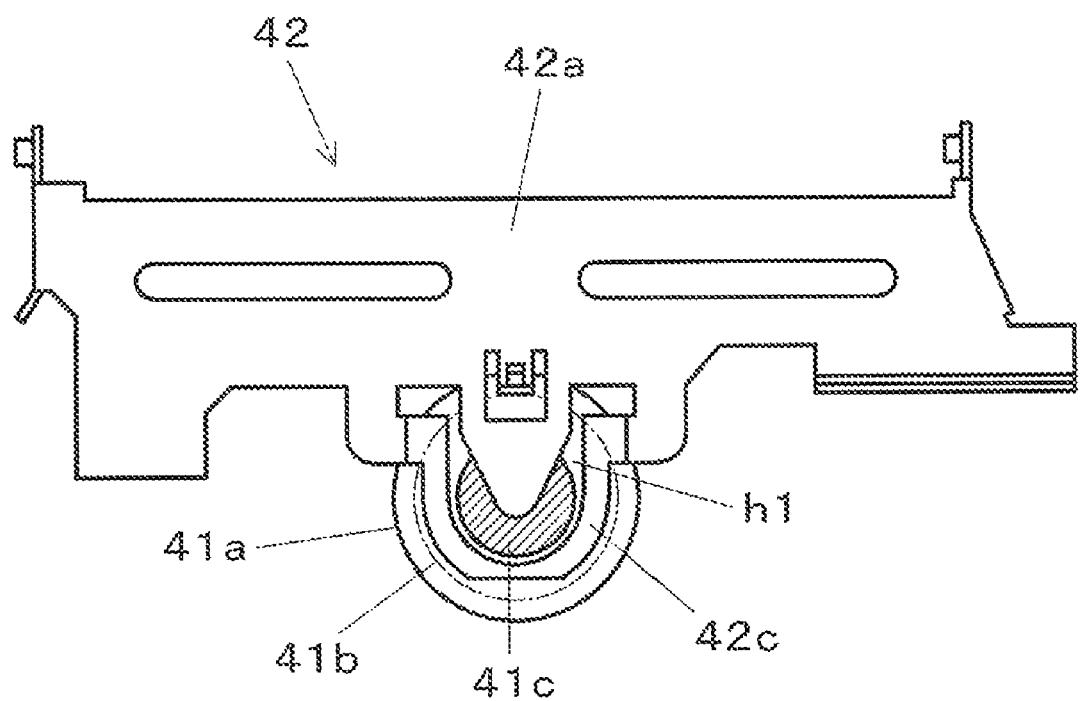
FIG. 5 is a plan view which shows the state that the clamping plate is assembled on the clamp base.

Next, holding portion 42c is interposed between surface plate portion 41a of clamping plate 41 and flange portion 41b as well as rotatably holding clamping plate 41 as shown in FIG. 5. As obviously shown in FIG. 5, the width of cut hole h1 is smaller than the outer diameters of surface plate portion 41a and flange portion 41b as well as a little bit larger than the outer diameter of small plate 41c. Also, the gap between surface plate portion 41a and flange portion 41b (i.e., the width t of annular groove 41d) is larger than the thickness of clamper holder 42c. Therefore, clamper 41 can move in diameter and axial directions and is prevented from detachment in the axial direction. In addition, surface plate portion 41a, flange portion 41b and small-radius body portion 41c can rotate without contacting holding portion 42c.

Figure 6:
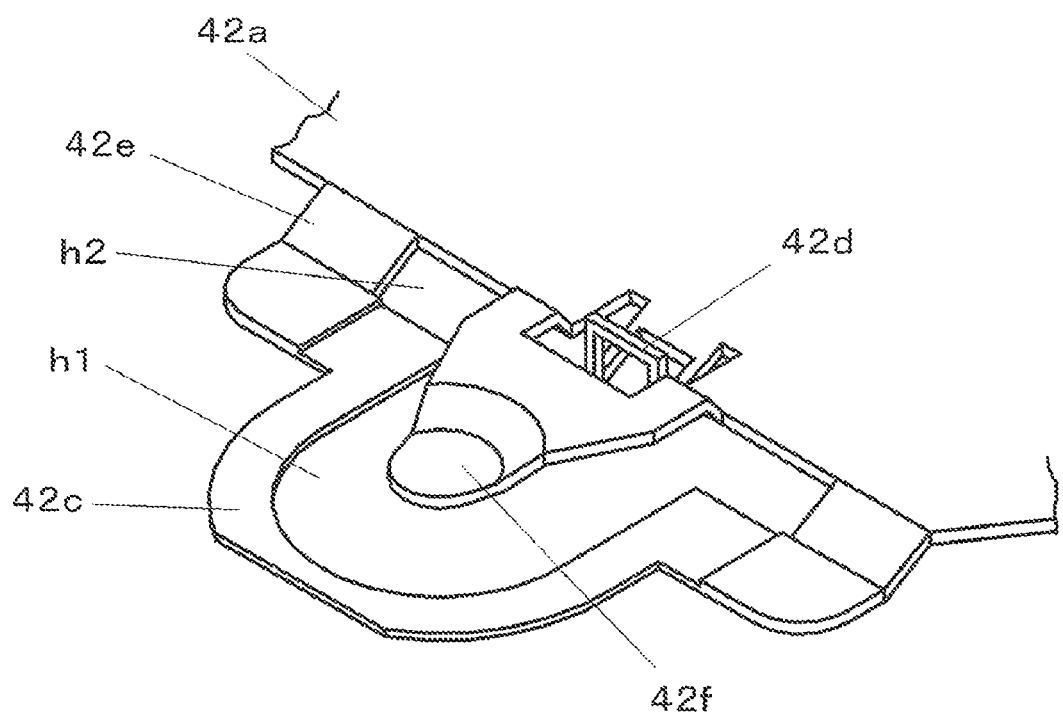
FIG. 6 is an enlarged perspective view which shows a part of the clamp base.

Also, as obviously shown in FIG. 6, clamp base 42 is integrally formed while including holding portion 42c, stopper piece 42d bent in V-shape, bent portion 42e connecting body portion 42a with holding portion 42c, and thrust bearing plate 42f protruding from body portion 42a to holding portion 42c side. Stopper piece 42d extends from body portion 42a to the center of bent portion 42e. Elongated hole h2 is bored along the length direction of body portion 42a, in bent part 42e. Bent portion 42e is an inclined portion adjacent to holding portion 42c. Body portion 42a and holding portion 42c are joined together via bent portion 42e with a predetermined height difference (a few millimeters) between them. Elongated hole h2 is adjacent to cut hole h1 in holding portion 42c. Moreover, the length of elongated hole h2 is larger than the width of cut hole h1 to enable flange portion 41b of clamping plate 41 to pass along the diameter direction. Thus, small-radius body portion 41c can be guided to cut hole h1.

Figure 7A:
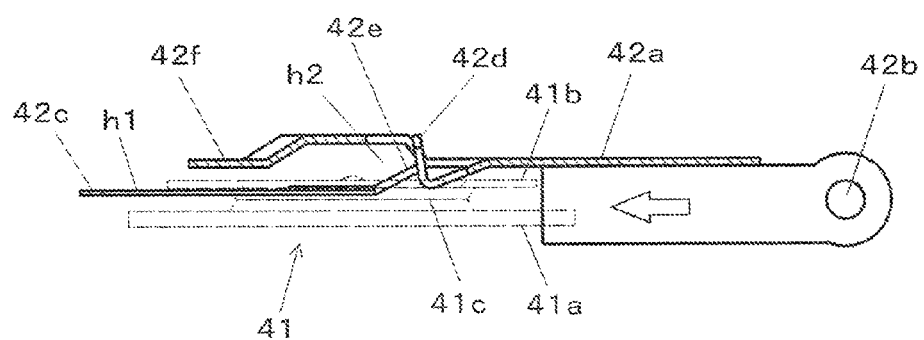
FIGS. 7(a) and (b) are explanatory views which show that the clamping plate is assembled on the clamp base.
Figure 7B:
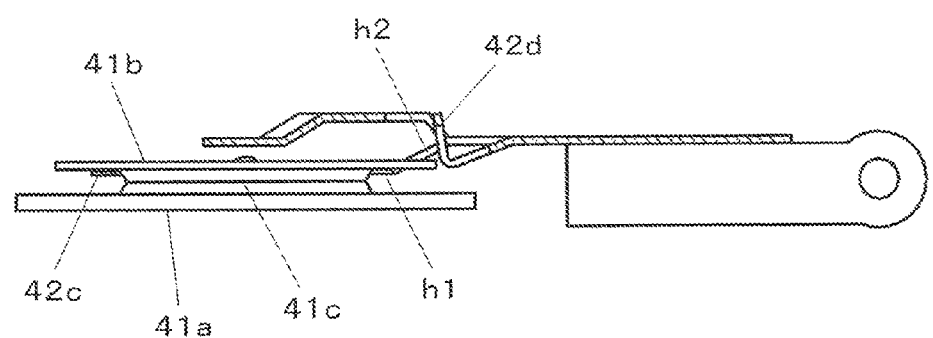

In other words, as shown in FIG. 7(a), clamping plate 41 and small-radius body portion 41c may be introduced into the cut hole h1 and placed at holding portion 42c with flange portion 41b to pass through elongated hole h2 in the diameter direction. Thus, holding plate 42c can be placed between body portion 42a and flange portion 42b as shown in FIG. 7(b).

Stopper piece 42c faces the outer-edge of flange 41b of clamping plate 41 disposed at holding portion 42c. This restricts movement of clamping plate 41 in the diameter direction and prevents small-radius body portion 41c from unexpectedly dropping out from cut hole h2. When clamping plate 41 is disposed in holding portion 42c, stopper piece 42d interferes with flange portion 41b. Flange portion 41b, however, is bent against stopper piece 42d by firmly inserting clamping plate 41 to the side of holding portion 42c when the outer-edge of flange portion 41b contacts stopper piece 42d as shown in FIG. 7(a). Therefore, clamping plate 41 can be guided to holding portion 42d. Also, stopper piece 42d may have elasticity so that stopper piece 42d can be bent against flange portion 41b When disposing clamping plate 41 in holding portion 42c.

Figure 8:
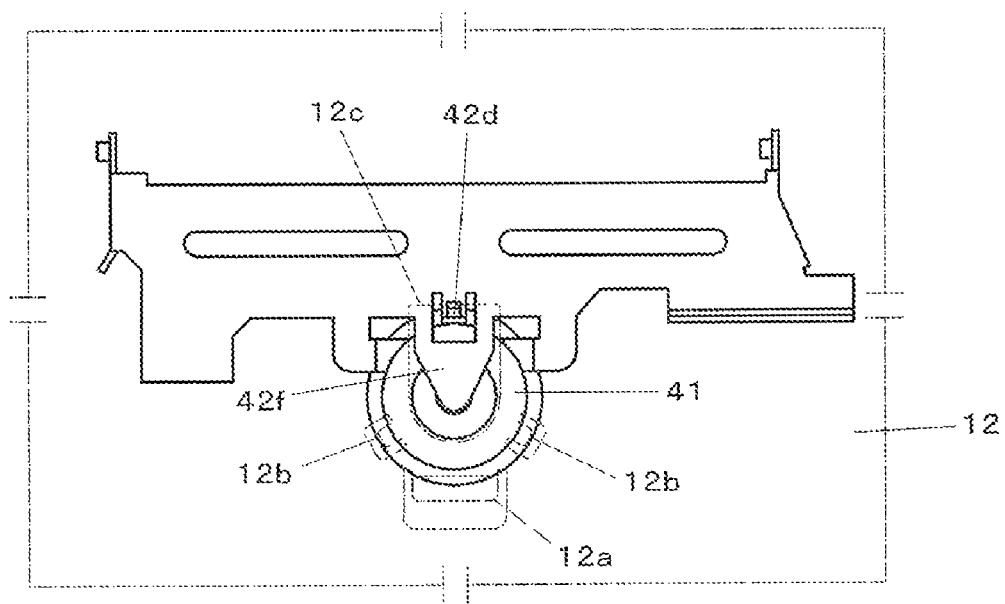
FIG. 8 is a plan view which shows the position relation of the clamping plate and the lock means which locks the clamping plate.

In FIG. 8, protrusions 12a and 12b are formed, while facing clamping plate 41, on top plate 12 which will be the surface of the disc driving apparatus and limit a movement of clamping plate 41. Protrusion 12a, as the first lock means, limits a movement in the axial direction (the direction perpendicular to the sheet of the illustration of FIG. 8) of clamping plate 41. Protrusions 12b and 12b, as the second lock means, limit clamping plate 41 movement in the diameter direction of clamping plate 41 while cooperating with stopper piece 42d.

Figure 9:
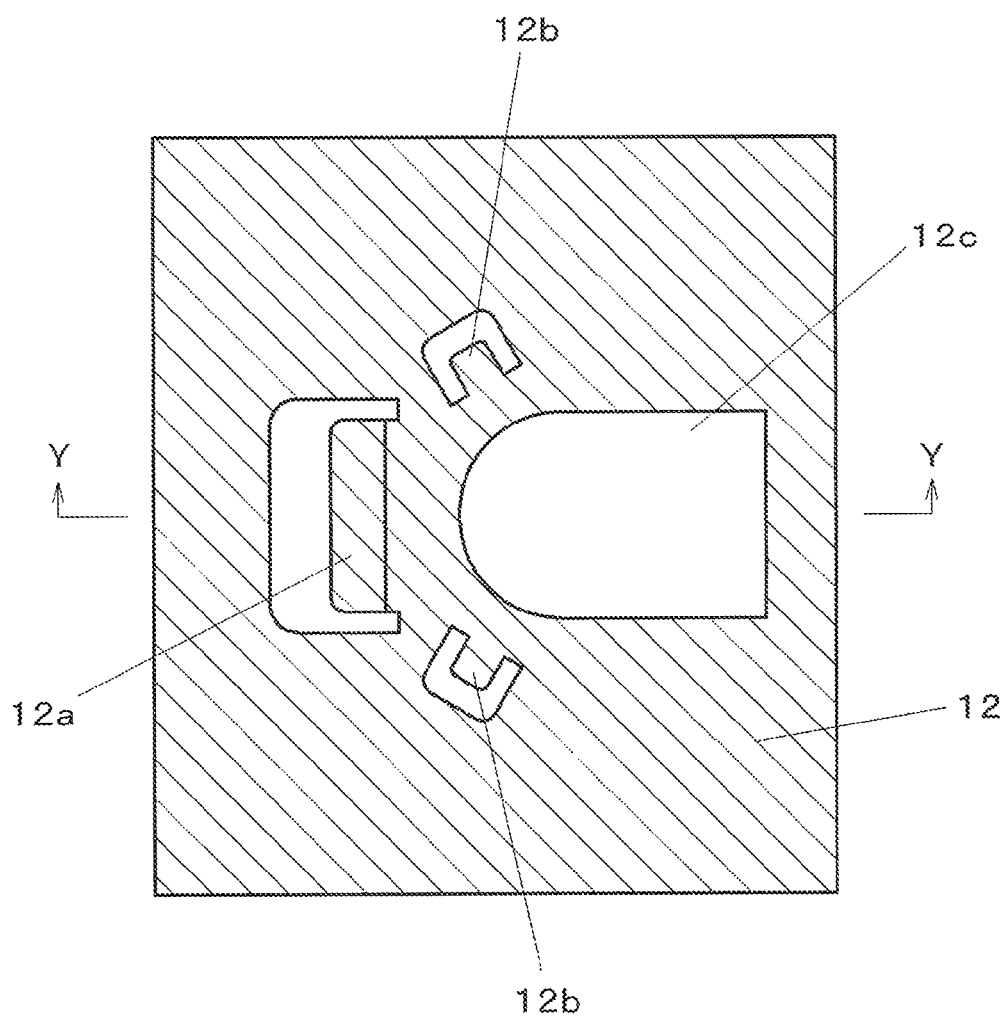
FIG. 9 is an enlarged plan view of apart of the top plate including the lock means.
Figure 10:
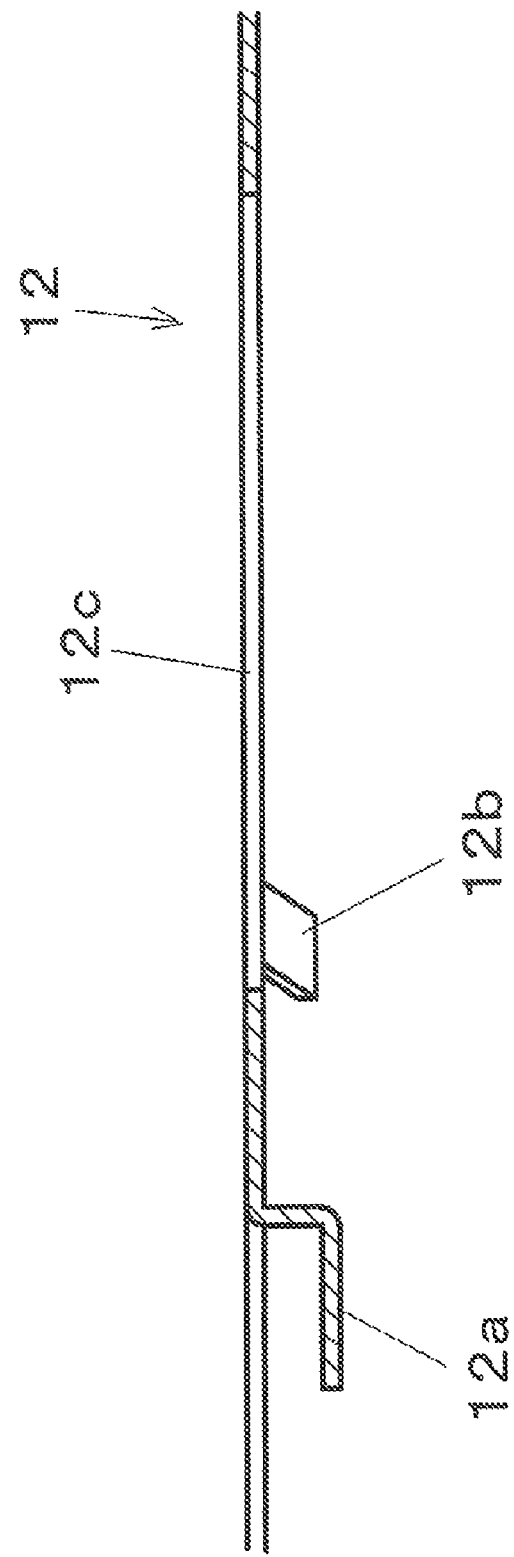
FIG. 10 is a cross-sectional view taken along the line Y-Y in FIG. 9.

Also, as obviously shown in FIG. 9 and FIG. 10, protrusion 12a is bent in an L-shape at the position close to hole 12c in top plate 12. Protrusions 12b and 12b are in both sides of hole 12c. Especially, protrusions 12b and 12b are parts of top plate 12, which are bent downward in a declined shape, and have a "\ /" shape. Here, hole portion 12c faces thrust bearing plate 42f of clamp base 42 (refer to FIG. 8). Thus, when clamp base 42 is in the clamp-position, top plate 12 is prevented from interfering with thrust bearing plate 42f. In FIG. 9, the hatched portion does not mean a section but instead a closed portion of top plate 12.

Figure 11:
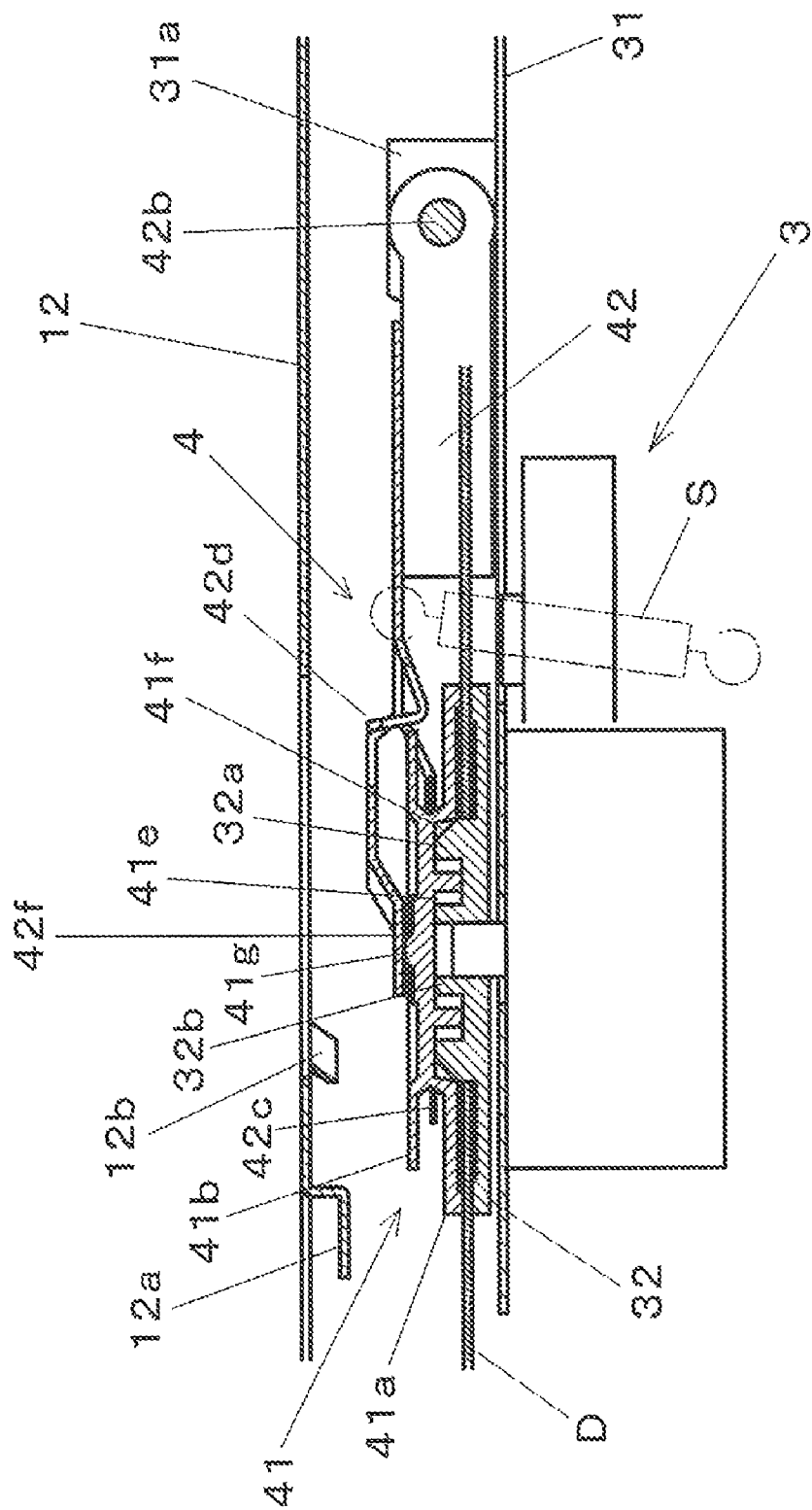
FIG. 11 is an explanatory view that shows a state wherein the disc is in the clamp-position.
Figure 12:
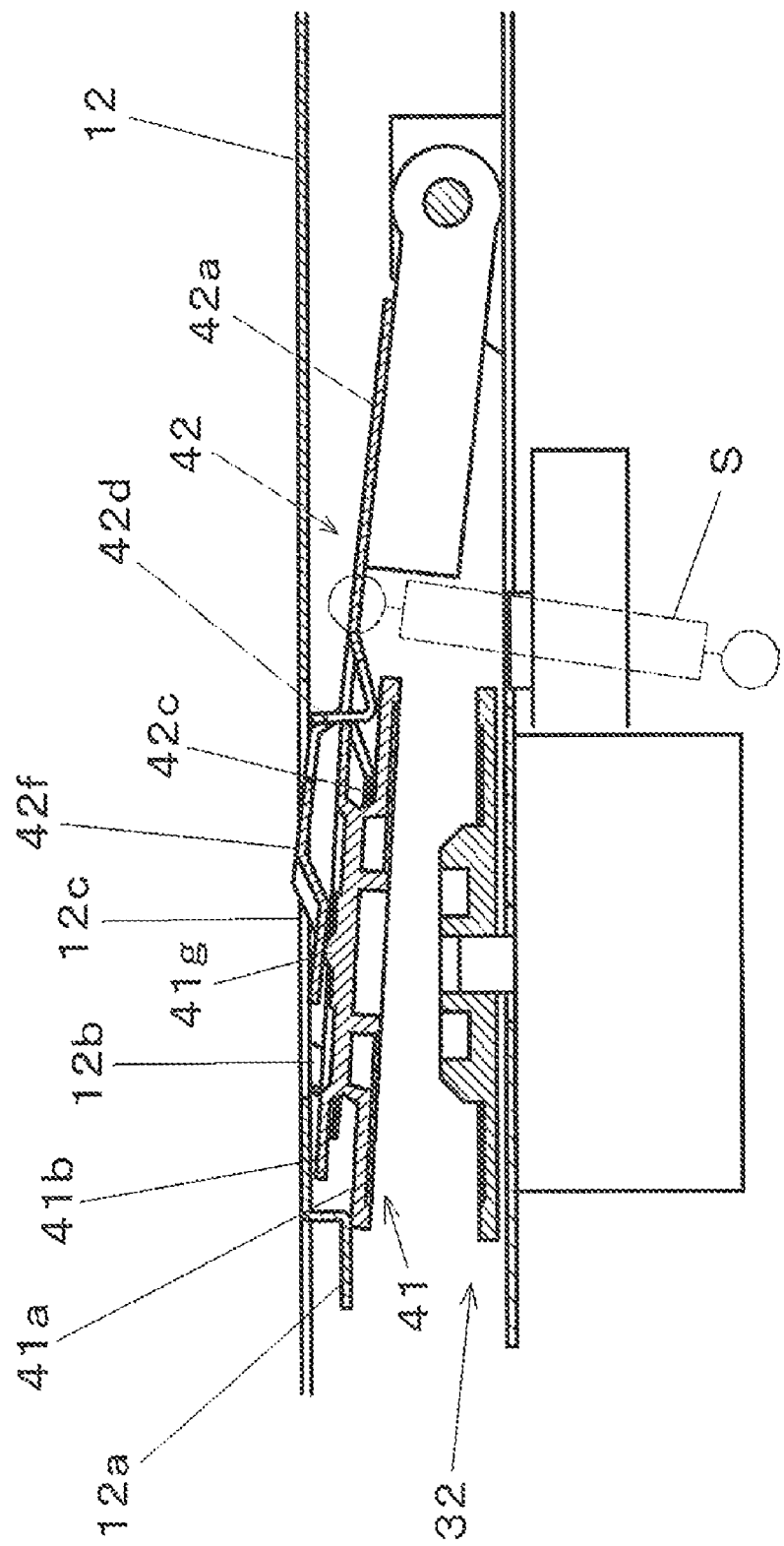
FIG. 12 is an explanatory view which shows a state wherein the disc is in the clamp-released position.

FIG. 11 and FIG. 12 show a position to install disc-clamping mechanism 4, which includes top plate 12 having protrusion 12a and protrusions 12b shown above. As obviously shown in these figures, base plate 31 of drive unit 3 has bracket 31a to support fulcrum shaft 42b of clamp base 42. Clamp base 42 can pivot on fulcrum shaft 42b between the clamp position shown in FIG. 11 and the clamp-released position shown in FIG. 12.

As shown in FIG. 11, in the clamp position, surface plate portion 41a of clamping plate 41 contacts the center of disc D on turntable 32, and disc D is rotatably held by clamping plate 41 and turntable 32. At this time, hub 32a, which is on turntable 32, is inserted in annular concave portion 41f of clamping plate 41 and protrusion 32b, which is the center of hub 32a, is inserted in center concave portion 41e. Therefore, the center of clamping plate 41 corresponds to the center of turntable 32.

Clamping plate 41 is pushed upward by a reaction force of disc D. Then, protrusion 41g slides to and contacts with thrust bearing plate 42f of clamp base 42. In addition, holding portion 42c is in the middle between plate 41a of clamping plate 41 and flange portion 41b and does not contact with them. The edge of flange portion 41b faces stopper piece 42d. Further, clamp base 42 is connected to base plate 31 of driver unit 3 with spring S and is elastically supported to the direction of the clamp-position. At the clamp-position, plate 41a is pressed toward disc D because spring S provides elastic support force to protrusion 41g of clamping plate 41 through thrust bearing plate 42f.

Otherwise, when a disc on turntable 32 is ejected, clamp base 42 is moved to the clamp-released position by motion of the cam member (not illustrated) against the elastic support force of spring S. Then clamp base 42 is kept at the clamp-released position until the next disc is inserted.

As shown in FIG. 12, in the clamp-released position, thrust bearing plate 42f enters hole 12c of top plate 12. Then, surface plate portion 41a of clamping plate 41 is pressed toward the side of turntable 32 as a part of the upper-side of plate 41a, which contacts with protrusion 12a. Thus, the opposite side of clamping plate 41 to the side pressed by protrusion 12a (the closest side to body portion 42a of clamp base 42) is lifted up. Then, the surface of surface plate portion 41a on the opposite side of clamping plate 41 to the pressed side contacts with the bottom side of clamper holder 42c and stopper 42d. Also, the bottom-side of flange portion 41b on the side of protrusion 12a contacts with the surface of holding portion 42c. Moreover, thrust bearing plate 42f again contacts with protrusion 41g, which keeps apart thrust bearing plate 42f until reaching the clamp-released position. Therefore, movement in the axial direction of clamping plate 41 is limited.

In addition, clamping plate 41 is pressed toward stopper piece 42d side at the clamp-released position since the outer-edge (corner portion where the upper-side and end surface cross each other) of flange portion 41b contacts two inclined protrusions 12b from two directions. Therefore, the outer-edge (end surface) of flange portion 41b also contacts stopper piece 42d.

As a result, movement in the diameter direction of clamping plate 41 is limited. Thus, rattle from vibration of clamping plate 41 is alleviated since clamping plate 41 does not have a backlash under a vibration environment, for example during in-car use.

Although this embodiment is explained as above, clamping plate 41 is not limited to the configuration of being pushed toward the disc by the elastic support force of spring S. Alternatively, clamping plate 41 may include a magnet therein, and clamping plate 41 and turntable 32 may interpose the disc by the magnetic force. In this case, thrust bearing plate 42f may be omitted.

What is claimed is:

1. A disc-clamping mechanism comprising:
   a clamping plate sandwiching a disc by cooperating with a rotatable turntable; and
   a clamp base which rotatably holds the clamping plate, allowing movement between a clamp-position where the clamping plate contacts with the disc on the turntable, and a clamp-released position where the clamping plate is isolated from the disc,
   wherein the clamping plate comprises
   a surface plate portion pressing the disc toward the turntable when the clamp base is in the clamp-position,
   a small-radius body portion placed concentrically with the surface plate portion and having an outer diameter smaller than that of the surface plate portion, and
   a flange portion being parallel to the surface plate portion and protruding more than an end portion in an axial direction of the small-radius body portion,
   wherein the clamp base is integrally formed while including
   a thin-plate shaped holding portion interposed between the surface plate portion and the flange portion on the clamping plate,
   a stopper piece facing an end surface of the flange portion in the clamp-position, and
   a bent portion extending from the holding portion and having an elongated hole through which the flange portion is passed from the stopper piece side to the holding portion side in a diameter direction of the flange portion,
   wherein the holding portion has a cut hole which receives the small-radius body portion, the cut hole being adjacent to the elongated hole of the bent portion.

2. The disc-clamping mechanism according to claim 1, wherein the thickness of the holding portion is smaller than any other part of the clamp base.

3. The disc-clamping mechanism according to claim 2, wherein, when the clamp base is in the clamp-released position, the disc-clamping mechanism comprises a lock means that limits a movement of the clamping plate, and
   the lock means comprises
   a first lock means that limits a movement in the axial direction of the clamping plate by pressing the clamping plate toward the turntable and
   a second lock means that limits a movement in a diameter direction of the clamping plate by closely contacting the outer-edge of the clamping plate.

4. A disc driving apparatus comprising:
   a disc-clamping mechanism according to claim 2.

5. The disc-clamping mechanism according to claim 1, wherein, when the clamp base is in the clamp-released position, the disc-clamping mechanism comprises a lock means that limits a movement of the clamping plate, and
   the lock means comprises
   a first lock means that limits a movement in axial direction of the clamping plate by pressing the clamping plate toward the turntable and a second lock means that limits a movement in a diameter direction of the clamping plate by closely contacting the outer-edge of the clamping plate.

6. A disc driving apparatus comprising:
   a disc-clamping mechanism according to claim 5.

7. A disc driving apparatus comprising:
   a disc-clamping mechanism according to claim 1.

* * * * *